Feb. 14, 1939. G. SCHROEDER 2,147,461
ARC WELDING MACHINE
Filed Nov. 12, 1937 2 Sheets-Sheet 1

WITNESSES:
C. J. Weller.
F. V. Giolma

INVENTOR
Gerhard Schroeder.
BY
G. M. Crawford
ATTORNEY

Feb. 14, 1939.   G. SCHROEDER   2,147,461
ARC WELDING MACHINE
Filed Nov. 12, 1937   2 Sheets-Sheet 2
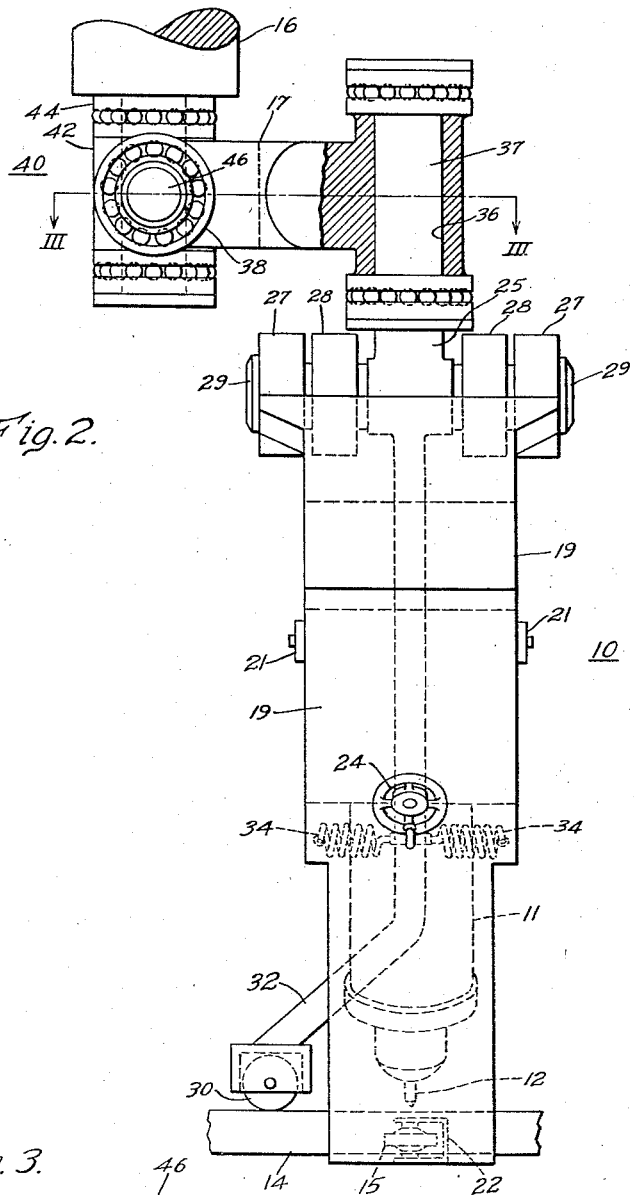
Fig. 2.
Fig. 3.
WITNESSES:
C. J. Weller.
G. V. Giolma
INVENTOR
Gerhard Schroeder.
BY
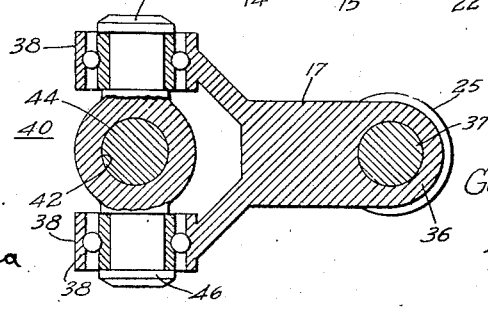
ATTORNEY Patented Feb. 14, 1939

2,147,461

UNITED STATES PATENT OFFICE 2,147,461

ARC WELDING MACHINE

Gerhard Schroeder, Isleworth, England, assignor to Westinghouse Electric & Manufacturing Company, East Pittsburgh, Pa., a corporation of Pennsylvania Application November 12, 1937, Serial No. 174,191
In Germany February 3, 1937

9 Claims. (Cl. 219—8)

My invention relates, generally, to arc-welding, and it has particular reference to machines for performing arc-welding operations on a workpiece.

In performing welding operations upon a workpiece, it is often desirable to weld a seam along some predetermined line. Under such circumstances, where the desired line of the weld is at all irregular, it has heretofore customarily been the practice to use either manually operated semi-automatic welding machines or cam operated automatic welding machines. In either instance, where the object to be welded is of a relatively large size, the problem of efficiently performing the welding operation becomes complicated. This is particularly so when the welding operation is to be performed adjacent to an edge of a workpiece of relatively large size having an irregular outline, as the welding head must then be capable of following a predetermined irregular line under varying conditions within widely separated limits. Cam operated welding machines must necessarily have complicated guiding mechanisms, and where a welding head must be capable of covering an extensive area in performing the welding operation, their construction becomes further complicated and they are more expensive to build. Manually operated semi-automatic machines, on the other hand, require the constant attention of an operator and, therefore, tend to place a limit on production and reduce the efficiency of output.

It is, therefore, generally an object of my invention to provide means for enabling an automatic welding operation to be performed along a predetermined line or path on a body of irregular shape.

More specifically, it is an object of my invention to provide means in an arc welding machine for permitting a movable welding head to rotate about a plurality of axes and readily perform a welding operation along a predetermined line at an adjustable distance from the edge of the object to be welded.

A further object of my invention is to provide guide means for permitting a welding machine to perform a plurality of related welding operations on a workpiece, where the line of a welding operation bears a predetermined relation relative to an edge of the workpiece.

Still another object of my invention is to provide means in the welding machine for biasing a guide member to engage a workpiece to maintain the welding head in a predetermined relation with respect to an edge of the workpiece.

A still further object of my invention is to provide means in connection with a seam-welding machine for positioning a welding head to follow a predetermined line relative to an edge of arbitrary shape and curve in a member being welded.

For a complete understanding of the nature and scope of my invention, reference may be had to the following detailed description, taken in connection with the accompanying drawings, in which:

Fig. 2 is a side elevation view of the welding machine of Fig. 1; and

Fig. 3 is a sectional view along the line III—III of Fig. 2.

Figure 1:
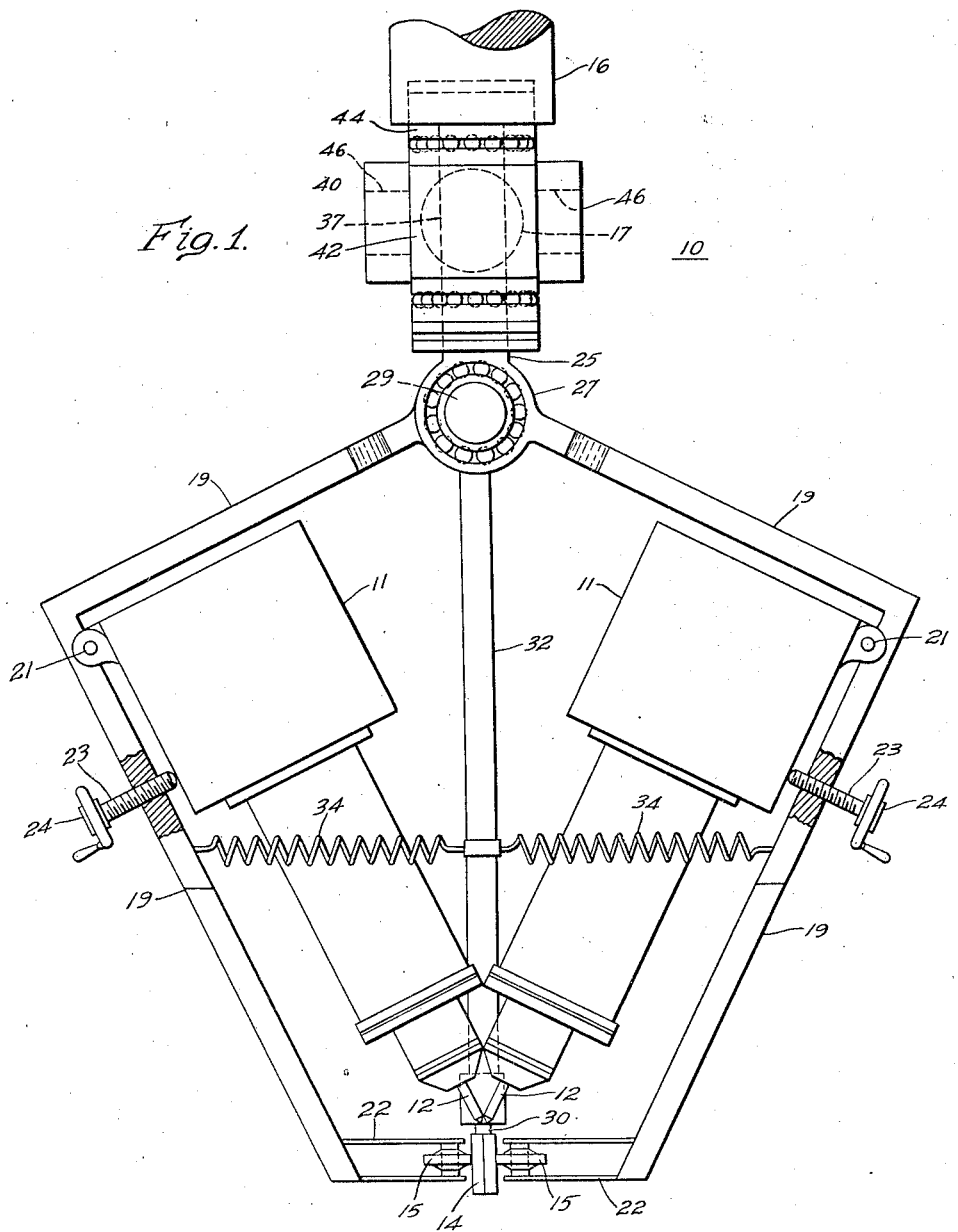
Figure 1 is a front elevational view partly in section of a welding machine embodying a preferred form of my invention.

Referring to Figure 1, it may be seen that in practicing a preferred form of my invention, a welding machine, designated generally by the reference numeral 10, may comprise a plurality of welding heads 11, disposed to feed electrodes 12 and perform a welding operation on a workpiece 14, and guide members such as, for example, rolls 15, which are associated therewith for engaging the workpiece 14 and maintaining the welding heads 11 in a predetermined position relative thereto. The welding heads 11 may be connected in movable relation with a movable support member 16 by means of an intermediate support member 17, in such a manner that they are free to follow any predetermined line along the workpiece as determined by the guide rolls 15.

Referring more particularly to Fig. 1 of the accompanying drawings, it may be seen that, in order to provide maximum flexibility in the welding machine, I prefer that support arms 19 be provided, the welding heads 11 being pivotally connected therewith in any desired manner, such as by means of bearing pins 21. The guide rolls 15, which are disposed to engage the work-piece 14, upon which a welding operation is to be performed, and maintain the welding heads 11 in a predetermined position thereto, may be rotatably mounted on the support members 19, being, for instance, journalled in bifurcated extensions 22 thereof. Adjusting means of any suitable nature, such as the threaded shafts 23 and hand wheel 24 may be provided for adjusting each welding head 11 relative to its support member 19, thereby permitting a variation in the position of the welding heads 11 with respect to their associated guide roll 15, and permitting a welding operation to be performed at any desired distance from an edge of the object to be welded.

In order that the guide rolls 15 may readily follow lateral variations in a workpiece when a welding operation is being performed on a member of irregular outline, such as for example, a side member in an automobile frame, the support members 19 may be independently disposed in pivotal relation with a verticaly rotatable support pin 25. Bifurcated bearing journals 27 and 28, respectively, may be provided integral with respective support members 19 for engaging a bearing pin 29, which may be, as shown in Fig. 2, an integral portion of the rotatable support pin 25.

To permit the welding heads 11 to follow variations in the surface contour of the workpiece, an additional guide roll 30 may be provided, it being, for example, mounted on a guide arm 32, which, as shown in Figs. 1 and 2, may be an extension of the rotatable support pin 25. Springs 34 interposed between the support arms 19 and the guide arm 32 function to resiliently bias the guide rolls 15 into engagement with the workpiece 14, thereby permitting the welding heads 11 to follow, independently, a predetermined line relative to an edge of the workpiece. By adjustment of the handwheels 24, the position of the welding heads 11 may be altered, to vary the line of a welding operation relative to an edge of the workpiece.

In order that the welding heads 11 may readily follow a predetermined line with respect to an edge of the workpiece, the support pin 25 may be operatively connected with the movable support member 16, which is herein disposed to provide the motive power for permitting the welding heads to follow the desired line of a welding operation, by means of an intermediate support member 17. As is shown in Figs. 2 and 3, the intermediate support member 17 may provide a highly flexible coupling between the support pin 25 which carries the welding heads, and the movable support member. In this instance the intermediate support member 17 is provided with a bearing journal 36 at one end adapted to rotatably engage the bearing portion 37 of the supporting pin 25, and a bifurcated bearing portion 38 at the other end, having its axis perpendicular to the axes of the member 16 and the bearing journal 36. A rotatable pivot member 40 may be provided for rotatably connecting the intermediate support member 17 and the movable support member 16. As shown in Figs. 2 and 3 the member 40 may comprise a longitudinal journal portion 42, for engaging an extended bearing portion 44 of the movable support member 16, and a pair of oppositely disposed aligned integral bearing bosses 46, having their axis disposed in quadrature to the axis of the longitudinal journal portion 42, for engagement with the bifurcated bearing member 38 of the intermediate support member 17.

From the foregoing description it may be seen that the pivot member 40 is free to rotate about the support member 16, and the intermediate support member 17 in being pivoted about the bearing bosses 46 of the pivot member 40, is, therefore, free to rotate in a plurality of planes. The support pin 25, by being rotatably connected with the intermediate support member 17, may, therefore, readily be moved relative to the work 14 by movement of the support member 16. The welding heads 11, which are adjustably carried by the support arms 19, are, therefore, not only flexibly mounted with respect to the workpiece 14 and guide roll 30, but are in adjustable relation with the guide rolls 15 and with each other, and may be moved along any predetermined line relative to an edge of the workpiece 14 by movement of the support member 16.

It may thus be seen that by my invention I have provided for supporting the welding heads 11 in such a manner that they are free to rotate about a plurality of axes and may be maintained in a predetermined position relative to an edge of the body being welded by means of the resiliently biased guide rolls 15 and the fixed guide roll 30, thereby affording them the maximum flexibility of motion in a simple manner, to permit them to follow readily a predetermined line with respect to the edge of the member being welded as they are moved relative thereto by motion of the movable support member 16. As will be readily understood the support member 16 may be secured to any suitable carriage or handling device for moving the welding machine relative to the work.

Since certain changes may be made in the above construction, and different embodiments of the invention may be made without departing from the spirit thereof, it is intended that all matter contained in the above description or shown in the accompanying drawings shall be considered as illustrative, and not in a limiting sense.

I claim as my invention:

1. A welding machine for operating on an article to be welded comprising, in combination, a welding head, means for carrying the welding head, guide means cooperative with said carrying means to engage the article to be welded and hold the welding head in predetermined horizontal and vertical relation to the article to be welded, and means for adjusting the welding head relative to the guide.

2. The combination in a welding machine for performing a welding operation on an article, of a welding head, a supporting frame disposed to carry the welding head, guide means resiliently biased against the article to maintain the welding head in predetermined relation to an edge of the article, and adjusting means associated with the welding head and frame for varying the position of the welding head relative to the guide means.

3. A welding machine comprising, in combination, a plurality of welding heads for cooperatively performing a welding operation on a piece of work, means for supporting the welding heads, guide means associated with the welding heads for predetermining the position of the welding heads relative to the work, means cooperative to urge the guide means into engagement with the work, and adjusting means for varying the position of a welding head relative to the guide means.

4. In a device for performing a welding operation on a workpiece the combination, of a movable support member, an intermediate support arm rotatable about a plurality of axes with relation to said movable support member, a guide arm rotatably disposed in connection with the intermediate support arm for engaging a piece of work upon which a welding operation is to be performed, a welding head adapted to perform a welding operation on said work, support means for carrying the welding head disposed in pivotal connection with said guide arm, and additional guide means resiliently disposed into engagement with the work to maintain the welding head in a predetermined relative position thereto, and means for adjusting the position of the welding head relative to the last-mentioned guide means.

5. The combination in a machine for performing a welding operation on an article, comprising, a plurality of welding heads, a supporting frame for carrying the welding heads, guide means resiliently disposed to maintain said welding heads in predetermined lateral relation with an edge of the article being welded, additional guide means for controlling relative motion of the welding heads and article being welded in a plane perpendicular to the effective plane of control of the aforesaid guide means, and means for adjusting the position of the welding heads relative to the first-mentioned guide means.

6. In a welding machine for performing a welding operation on a workpiece the combination, of a movable support member, a welding head, a supporting frame for the welding head, guide means disposed to maintain the welding head in a predetermined position relative to an edge of the work piece, and means comprising a plurality of intermediate support members disposed in rotatable connection between the movable support member and the frame for permitting the welding head to pivot about at least four axes.

7. The combination in a welding machine for performing a welding operation on a workpiece, of a plurality of welding heads, means for supporting said welding heads, guide means disposed to maintain the welding heads along a predetermined arbitrary line on the work piece, means for adjusting the position of said welding heads relative to said guide means, additional guide means disposed to control relative movement of the welding heads and work perpendicular to the plane of the work, a movable support, and means including an intermediate support arm rotatable about a plurality of axes for connecting the movable support and supporting means to permit the welding heads to perform a welding operation along a predetermined arbitrary line in the workpiece.

8. The combination in a welding device for performing a welding operation on an article, of a plurality of welding heads, support means associated with the welding heads, guide members individually associated with the welding heads for engaging the article to be welded, means for adjusting said welding heads relative to said guide members, means for resiliently urging the guide members into engagement with the article for maintaining the welding heads in a predetermined relation with respect thereto, a movable support member, and means including an intermediate support arm rotatable about a plurality of axes for operatively associating the welding heads with the movable support member to permit the welding heads to follow a predetermined path relative to a guide member.

9. In a machine for performing an arc-welding operation on an article, the combination, of a plurality of welding heads, a guide member adapted to follow surface variations of an article to be welded, support means for carrying the welding heads disposed in pivotal relation with said guide member, guide means operable to maintain the welding heads in predetermined lateral relation with the article to be welded, means for resiliently maintaining said guide means in engagement with the article to be welded, means for adjusting said welding heads relative to said guide means, and means comprising a movable support member and a pivotal connecting member for moving the welding heads along a predetermined line for performing a welding operation on the article.

GERHARD SCHROEDER.